June 7, 1938.    C. J. HUG    2,120,098
TRUCK WHEEL
Filed Nov. 19, 1936    2 Sheets-Sheet 2
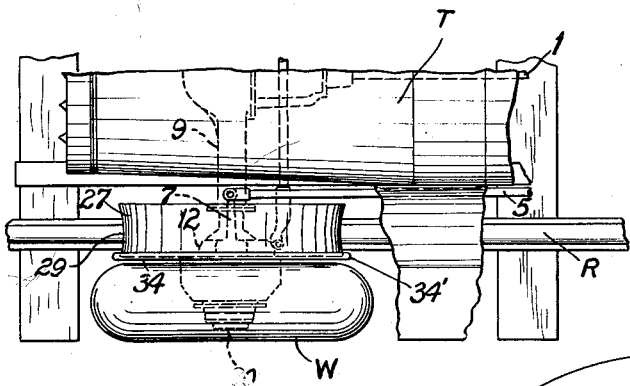
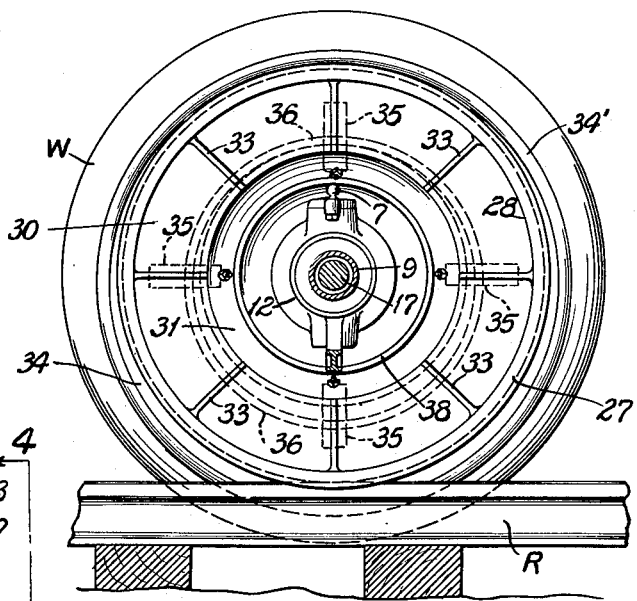
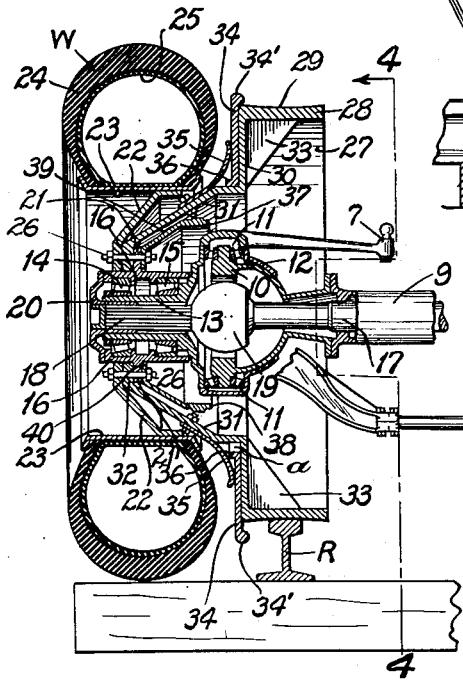
INVENTOR;
CHRISTIAN J. HUG
BY Harry A. Bennes
ATTORNEY Patented June 7, 1938

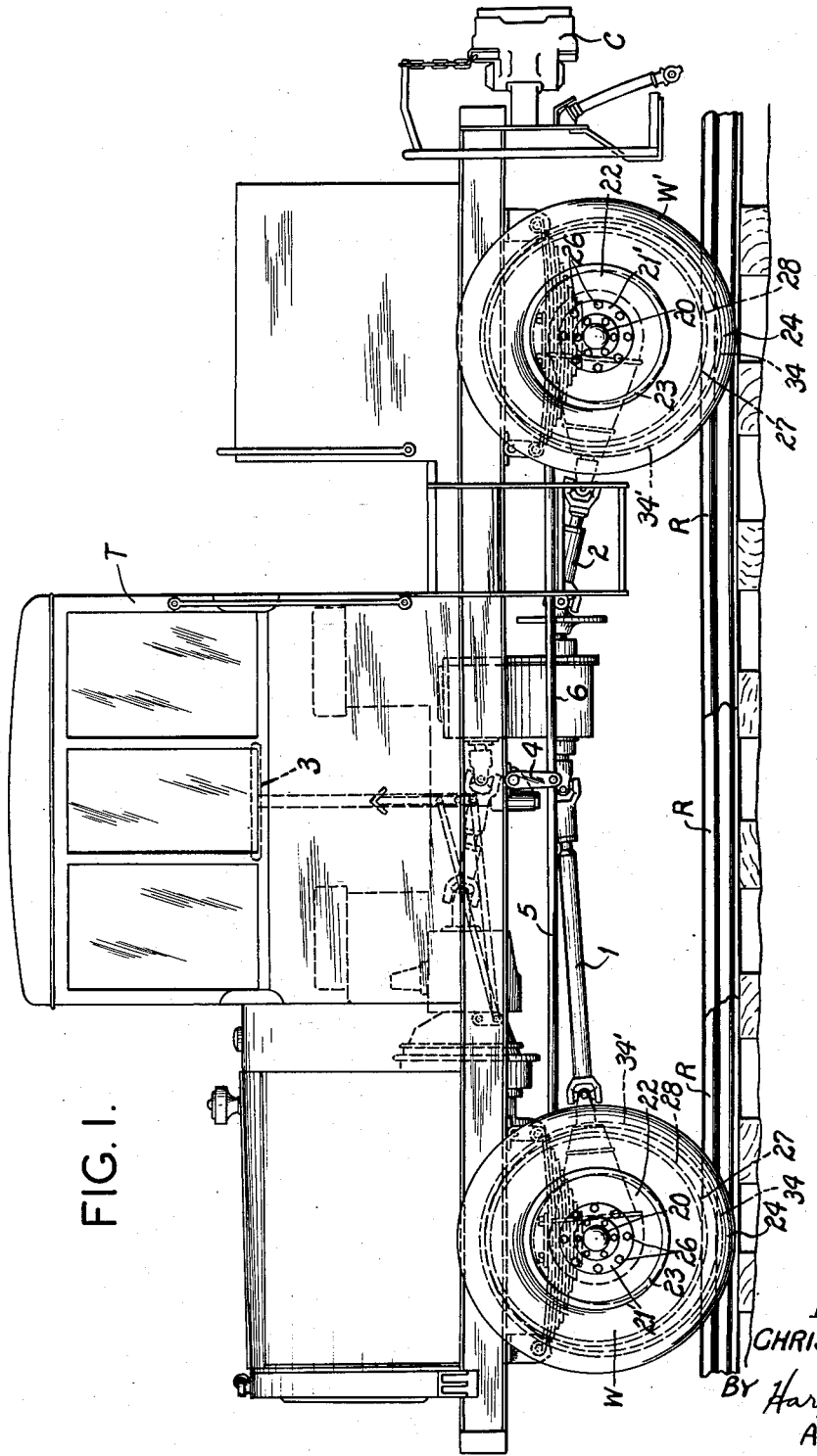

2,120,098

UNITED STATES PATENT OFFICE 2,120,098

TRUCK WHEEL

Christian J. Hug, Highland, Ill.

Application November 19, 1936, Serial No. 111,590

2 Claims. (Cl. 295—8.5)

My invention has relation to improvements in vehicle wheels and it consists in the novel features of construction more fully set forth in the specifications and pointed out in the claims. The invention is primarily directed to wheels embodying the combination of both a pneumatic tire and a steel wheel section, the former being adapted to support the vehicle on the road and the latter being adapted to support the vehicle on rails. I am aware of the fact that the broad principle of combining a pneumatic wheel with a track wheel is not new, but such combination wheels, as far as I am aware, utilized the standard type of railway car wheel which imports into the combination certain serious disadvantages.

I have sought to overcome these disadvantages by utilizing for the railway car wheel entering into the combination a flangeless wheel having a concave tread. The advantage of eliminating the flange is that the truck may be more easily driven on and off the rails and the advantage of the concavity of the tread is that it assists the operator in steering the vehicle and holding the same on the rails.

These advantages, together with others inherent in the invention, will be better apparent from a detailed description thereof in connection with the accompanying drawings, in which:

Figure 1 is a side elevation of a truck equipped with wheels of my invention; Fig. 2 is a top plan of a fragment of the forward portion of the truck showing one of the front wheels in plan view.

Figure 3 is a vertical cross section taken through my improved combination wheel; and Fig. 4 is a cross-sectional view taken on a plane indicated by the line 4—4 in Fig. 3 and showing an inside elevational view of my improved wheel.

Referring to the drawings, T represents a truck adapted for heavy duty, including its use for drawing railway cars along the railroad track comprising the rails R, R. The truck is equipped with a coupling C whereby it may be connected to a railway car, which is not shown in the drawings. In the present instance, the truck is of the 4-wheel drive and 4-wheel steer type, the front wheels W being driven by a propeller shaft 1 and the rear wheels W' by a propeller shaft 2 and both front and rear wheels being steered from a single steering wheel 3. The steering wheel 3, as is well known in the art, operates a pitman arm 4 to which is connected a front drag rod 5 and rear drag rod 6 leading to front steering knuckle 7 and rear steering knuckle 8.

The parts thus far described are well known in the art and no invention is claimed therein. Furthermore, it is immaterial, as far as the present invention is concerned, whether or not the truck T is of the 4-wheel drive and steer type. However, it has been found in practise that trucks intended for use both on and off the rails of a railroad track are better adapted to perform their functions if they are of the 4-wheel steer type.

As stated above, the invention is primarily directed to the construction of an improved wheel and the balance of the description to be confined thereto. Referring to Fig. 3, 9 represents the axle housing, the outer end of which terminates in a ring 10 to receive roller bearings 11 on which is pivotally supported the housing extension 12 carrying the terminal portion of the axle 13 supporting bearings 14 and 15 on which wheel hub 16 is mounted. Within axle housing 9 is a drive shaft 17 terminating in a splined extremity 18 and embodying a universal joint 19 located on the pivotal center of the housing extension 12. The splined portion 18 of the shaft 17 engages with an inside extension on the hub cap 20 and the hub cap is bolted or otherwise secured to the wheel hub 16 so that the rotation of the shaft 17 is imparted to the wheel W through said hub 16 and wheel spoke disc 22.

The parts thus far described are all old in the art and do not enter into the invention except in so far as they relate directly to the construction of the wheel itself.

The wheel spoke disc 22 carries the usual felloe 23 in which is mounted a pneumatic tire casing 24. Obviously, an inner tube 25 is dispossed within the casing 24. The hub 16 is provided with an annular flange 21 to which the spoke disc 22 is bolted by means of bolts 26. The wheel hub 16 also supports a steel flange track wheel 27 inside of the pneumatic tire casing 24.

The wheel 27 comprises a rim 28 having a concave tread surface 29 and a vertical wall portion 30 extending inwardly from the rim 28, from which wall portion there is a conical portion 31 extending inside of the felloe 23 and terminating in a flange 32 secured to hub flange 21 between said flange and the spoke disc 22 by means of the bolts 26. There are a plurality of triangular ribs 33 extending entirely around the inside of the rim 28 for the purpose of stiffening the same. A ring plate 34 is disposed over the cone 31 and held in contacting relation with the wall 30 by means of four equally spaced springs 35 bolted or otherwise secured at their inner ends to said cone 31. The peripheral edge of the ring plate 34 is provided with a bead 34' and the inner edge of said ring plate is provided with a small flange 36 which normally rests on the cone 31. However, it will be observed that the opening in the ring plate 34 is slightly larger than the diameter of the cone 31 comprising the hub of track wheel 27, so that when the ring plate 34 rests on the top of said hub 31, the bottom of its peripheral edge will extend below the tread 29 of track wheel 27. The function of ring plate 34 is to serve as a shield to protect the inside of the casing 24 from rubbing against the bottom inside edge of rim 28 when the casing is compressed under loads and jolts while in use. The ring plate 34 also protects the casing against contact with the rim 28 when the wheel is being driven off a railroad track, as at such times the casing must necessarily pass over said track.

The clearance $a$ between the opening in the ring plate 34 and hub 31 permits said ring plate to move upwardly as it contacts with the rail R while driving the track wheel 27 off of said rail so that said plate may move over the rail without being damaged.

A brake drum 37 is fixed to the hub flange 21 by the same bolts 26 that secure the pneumatic component and steel component of the wheel W thereto. The brake drum comprises a cylindrical portion 38, a conical portion 39 and a flange 40 which receives said bolts 26.

The absence of flanges on the tread 29 of wheel 27 greatly facilitates the driving of said wheels on and off the rails R and the concavity of the tread 29 tends to hold said wheels on the rail and assist the operator of the vehicle in steering the same while it is travelling over the rails R.

Having described my invention, I claim:

1. A vehicle wheel having a hub, a pneumatic wheel component and a steel track wheel component carried by said hub in juxtaposed relation, said track wheel component having a flangeless concave tread, and a ring plate movably carried by the track wheel component between said component and the pneumatic component.

2. A vehicle wheel having a hub, a pneumatic wheel component and a steel track wheel component carried by said hub in juxtaposed relation, a ring plate mounted for vertical movement between the pneumatic wheel and the track wheel, said track wheel component having a flangeless concave tread, and spring means bearing against said ring plate to hold the same yieldingly against the steel track wheel.

CHRISTIAN J. HUG.